United States Patent
He et al.

(10) Patent No.: US 8,912,729 B2
(45) Date of Patent: Dec. 16, 2014

(54) BACKLIGHT MODULE AND AN LCD THEREOF

(75) Inventors: Chengming He, Shenzhen (CN); Chingyuan Yang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 750 days.

(21) Appl. No.: 12/996,342

(22) PCT Filed: Sep. 1, 2010

(86) PCT No.: PCT/CN2010/076523
§ 371 (c)(1),
(2), (4) Date: Dec. 3, 2010

(87) PCT Pub. No.: WO2012/006803
PCT Pub. Date: Jan. 9, 2012

(65) Prior Publication Data
US 2012/0007523 A1    Jan. 12, 2012

(30) Foreign Application Priority Data
Jul. 12, 2010  (CN) .......................... 2010 1 0225560

(51) Int. Cl.
H05B 39/00    (2006.01)
H05B 33/08    (2006.01)
(52) U.S. Cl.
CPC ................................. *H05B 33/0815* (2013.01)
USPC .......... 315/209 R; 315/226; 315/224; 315/307
(58) Field of Classification Search
USPC .......... 315/185 R, 186, 192, 193, 201, 209 R, 315/210, 217, 225, 226, 289, 291, 294, 295, 315/297, 299, 307, 312, 313, 320, 322, 315/362; 362/13, 15, 16, 17, 56.01, 56.02, 362/63, 123, 126, 127, 131, 132, 134, 135, 362/136
See application file for complete search history.

(56) References Cited

U.S. PATENT DOCUMENTS

| | | | |
|---|---|---|---|
| 2006/0138971 A1* | 6/2006 | Uang et al. ..................... | 315/291 |
| 2008/0218100 A1 | 9/2008 | Parikh | |
| 2009/0021175 A1* | 1/2009 | Wendt et al. .............. | 315/200 R |
| 2009/0152569 A1 | 6/2009 | Cheng et al. | |
| 2010/0060190 A1 | 3/2010 | Cheng | |

FOREIGN PATENT DOCUMENTS

| | | |
|---|---|---|
| CN | 101022000 A | 8/2007 |
| CN | 101064469 A | 10/2007 |
| CN | 101193479 A | 6/2008 |
| CN | 101202504 A | 6/2008 |
| CN | 101409044 A | 4/2009 |
| CN | 101661709 A | 3/2010 |
| JP | 2006254700 A | 9/2006 |
| KR | 20080050874 A | 6/2008 |

\* cited by examiner

*Primary Examiner* — Thuy Vinh Tran
*Assistant Examiner* — Jianzi Chen
(74) *Attorney, Agent, or Firm* — Sughrue Mion, PLLC

(57) ABSTRACT

A backlight module and a liquid crystal display (LCD) device thereof are proposed. The backlight module includes a DC/DC converter producing a positive/negative voltage level. The backlight module can output the positive and negative levels of driving voltage from an output end of the inverter to drive LEDs through alternately switching. Besides, a constant current can be obtained with designs of power on/off periods and energy-storing inductors to prevent LEDs employing current limiting resistors from having too low current efficiency and from being burnt out.

10 Claims, 4 Drawing Sheets

BACKLIGHT MODULE AND AN LCD THEREOF

BACKGROUND OF THE INVENTION

1. Field of the Invention

The present invention relates to a backlight module, and more particularly, to a backlight module and an LCD using the backlight module.

2. Description of Prior Art

With a rapid development of monitor types, novel and colorful monitors with high resolution, e.g., liquid crystal displays (LCDs), are indispensable components used in various electronic products such as monitors for notebook computers, personal digital assistants (PDAs), digital cameras, and projectors. The demand for the novelty and colorful monitors has increased tremendously.

Backlight modules are one of key components of liquid crystal display panels (LCD panels). Liquid crystals do not emit light, so backlight modules provide an evenly distributed light source providing abundant brightness. The light source is transformed into a high-brightness planar light source having a uniform luminance distribution via a simple, effective opto-mechanism to provide LCD panels with a backlight source. LCD panels have been extensively employed in electronic devices having growth potential, such as monitors, notebook computers, digital cameras, projectors, etc., and particularly in large-sized panels like notebook computers and LCD monitors. Thus, demand for backlight units is growing gradually as well.

In addition to cold cathode fluorescent lamps (CCFLs), backlight modules also use light emitting diodes (LEDs) as a light source. LEDs have become the mainstream backlight source for LCD televisions in recent years, because they are mercury-free and thus environmentally-friendly. In addition, LEDs respond fast. Current LEDs are mostly driven by a direct current (DC). But, since LED lighting gets gradually popular, alternative current (AC)-driven LEDs have been more and more common as well. The advantage of AC-driven LEDs is that LEDs only turn on and off in half of the time during an entire circuit period; it greatly reduces heat dissipation from LEDs and further prolongs life of LEDs. For AC-driven LEDs under ideal operating conditions, current limiting resistors have to be connected in series with LEDs to limit the amount of current flowing through the LEDs. But, the conversion efficiency of the circuit may be thus lowered due to a voltage drop caused by the current flowing through the LEDs.

A reduction in the number of current limiting resistors may cause LEDs to be burnt out easily. AC voltage fluctuations vary with different areas and environments, and LED forward voltage (VF) changes with temperature and technologies of manufacturers. Thus, problems like the burn-out of LEDs or the brightness inadequacy of LEDs may occur if the number of current limiting resistors is deliberately reduced or the resistance is deliberately lowered for increasing efficiency.

SUMMERY OF THE INVENTION

Therefore, an object of the present invention is to provide a backlight module comprising a DC/DC converter producing a positive/negative voltage level. The backlight module can output an AC voltage from an output end of the converter through alternate on/off states of a switch to drive LEDs. In this way, LEDs using current limiting resistors can be prevented from having too low current efficiency and from being burnt out.

In one aspect, an LCD device comprises a power end for supplying a power supply voltage; a LCD panel for displaying an image; a converter electrically connected to the power end, comprising a switch signal generator for generating a switch signal, the converter for converting the power supply voltage to a positive voltage level of a driving signal in response to a first voltage level of the switch signal, and for converting the power supply voltage to a negative voltage level of a driving signal in response to a second voltage level of the switch signal, the positive and negative voltage levels being generated alternately; and a lighting device electrically connected to the converter, for generating light based on the positive and negative voltage levels of the driving voltage from the converter.

According to the present invention, the lighting device is an AC-driven LED.

According to the present invention, the lighting device comprises a first lighting unit, a second lighting unit, a third lighting unit, a fourth lighting unit, and a fifth lighting unit. The first lighting unit comprises a positive end and a negative end coupled to a first node and a second node, respectively. The second lighting unit comprises a positive end and a negative end coupled to the second node and a third node, respectively. The third lighting unit comprises a positive end and a negative end coupled to the third node and a fourth node, respectively. The fourth lighting unit comprises a positive end and a negative end coupled to the fourth node and the second node, respectively. The fifth lighting unit comprises a positive end and a negative end coupled to the third node and the first node, respectively.

According to the present invention, the converter comprises a capacitor element, a first switch, a second switch, a third switch, a first inductor element, a second inductor element, a first diode, and a second diode. The capacitor element is coupled to the lighting device in parallel. The first switch electrically coupled to the power end is used for turning on when the switch signal is at the first voltage level. The second switch electrically coupled to the power end is used for turning on when the switch signal is at the first voltage level. The first inductor element is electrically coupled to the first switch. The second inductor element is electrically coupled to the power end, the second switch, and the capacitor element. The third switch electrically coupled to the second inductor element and the power end is used for turning on when the switch signal is at the second voltage level. The first diode is electrically coupled to the capacitor element, the first inductor element, and the second switch. The second diode is electrically coupled to the capacitor element, the second inductor element, the first diode, and the third switch.

According to the present invention, the switch generator further comprises an inverter for inverting the switch signal.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENTS

Figure 1:
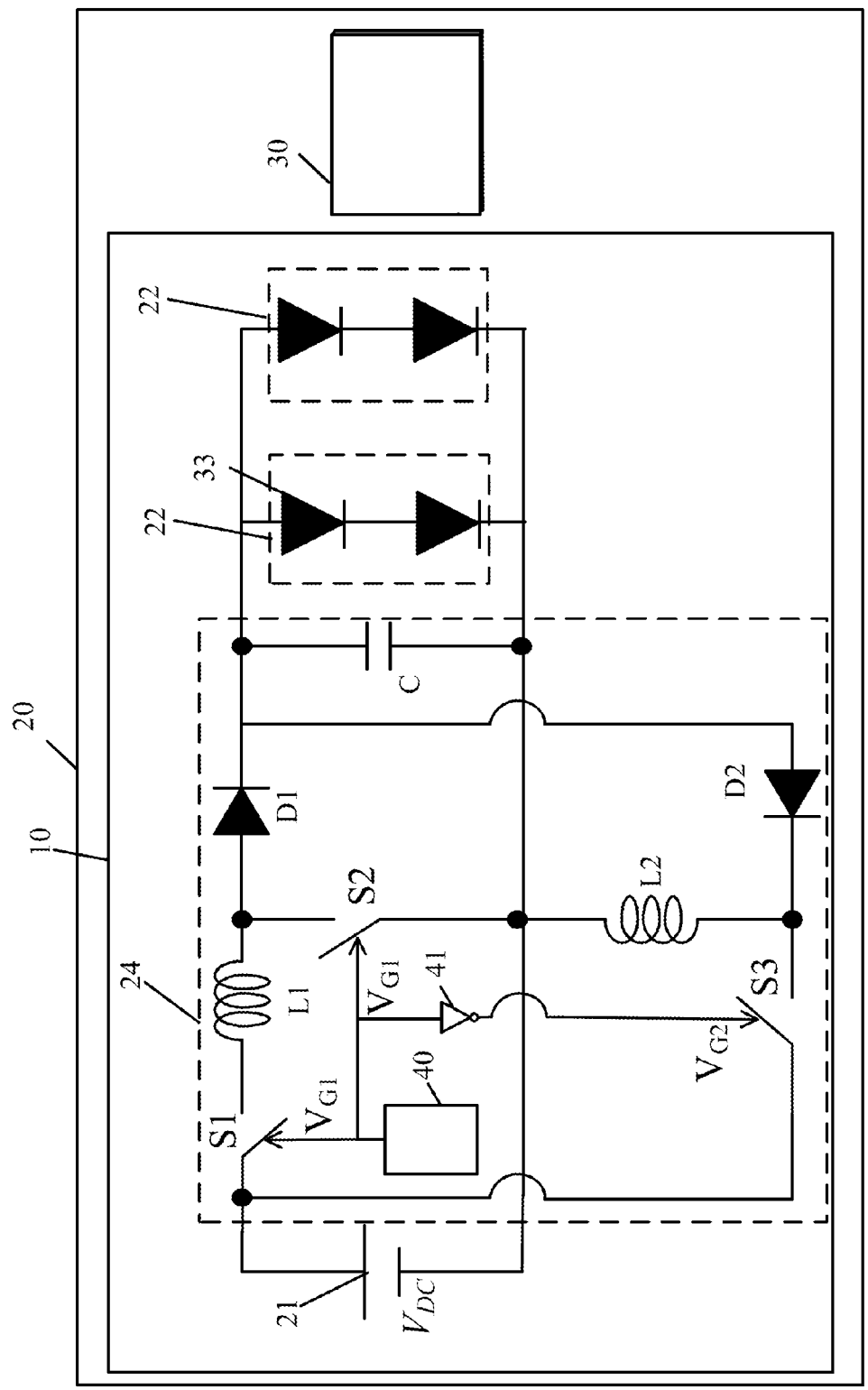
FIG. 1 shows a schematic diagram of an LCD device according to the preferred embodiment.

Referring to FIG. 1 showing a schematic diagram of an LCD device 20 according to the preferred embodiment, the LCD device 20 comprises a power supply end 21, an LCD panel 30, and a backlight module 10. The backlight module 10 generates light to the LCD panel 30 when the power end 21 supplies to the backlight module 10. The backlight module 10 comprises a lighting device 22 and a converter 24. The power end 21 supplies direct current (DC) supply voltage $V_{DC}$. The LCD panel 30 comprises a liquid crystal layer filled with liquid crystal molecules of which an alignment is varied based on image data to adjust the light from the backlight module 10 and thus to show various grey levels adjust. The lighting device 22 comprises a plurality of AC-driven LEDs 33 driven by AC power supply. The lighting device 22 connected between the converter 24 and a voltage end (e.g. ground end in FIG. 1), is used for generating light based on driving voltage from the converter 24.

Referring to FIG. 1, the converter 24 is used for converting the DC supply voltage VDC of 12V from the power end 21 into a high DC voltage signal with alternate positive/negative voltage levels. Actually, the DC voltage signal with alternate positive/negative voltage levels simulates an alternate-current (AC) voltage signal. The converter 24 comprises a switch signal generator 40, a capacitor element C, a first switch S1, a second switch S2, a third switch S3, a first inductor element L1, a second inductor element L2, a first diode D1, and a second diode D2. The capacitor element C is coupled to the lighting device in parallel. The first switch S1 is electrically coupled to the power end 21. The first inductor element L1 is electrically connected to the first switch S1. The second inductor element L2 is electrically coupled to the power end 21, the second switch S2, and the capacitor C. The third switch S3 is electrically coupled to the second inductor elements L2, the power end 21, and the second diode D2. The first diode D1 is electrically coupled to the capacitor element C, a first inductor element L1, and a second switch S2. The second diode D2 is electrically coupled to the capacitor element C, the second inductor L2, the first diode D1, and the third diode S3. All the switches S1, S2, and S3 can turn on based on the same polarity voltage. In one embodiment, the switch signal generator 40 is used for generating a first switch signal $V_{G1}$. The first switch signal $V_{G1}$ is inverted to output a second switch signal $V_{G2}$ by the inverter 41. In another embodiment, the first switch S1 and second switch S2 may be NMOS transistors, while the third switch S3 may be a PMOS transistor. The first switch S1, the second switch S2, and the third switch S3 are controlled by the same switch signal $V_{G1}$. When the switch signal $V_{G1}$ is at high voltage level, the first switch S1 and the second switch S2 turn on, but the third switch S3 turns off. Conversely, when the switch signal $V_{G1}$ is at low voltage level, the first switch S1 and the second switch S2 turn off, but the third switch S3 turns on. The inductor elements L1, L2 as energy storage element can storage energy when charge flows through.

Figure 2:
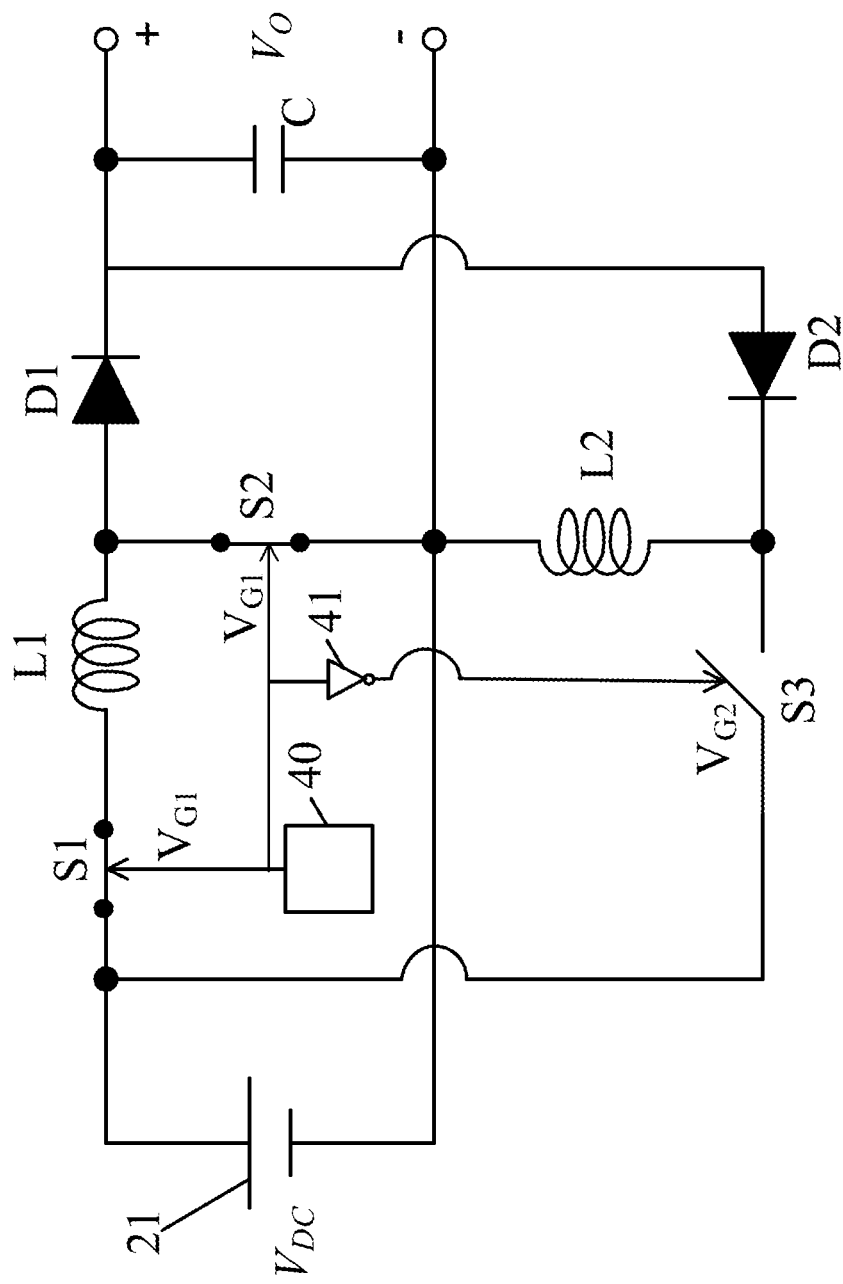
FIG. 2 shows the converter outputting a positive voltage level of driving voltage when the switches S1 and S2 turn on in response to the first switch signal
Figure 3:
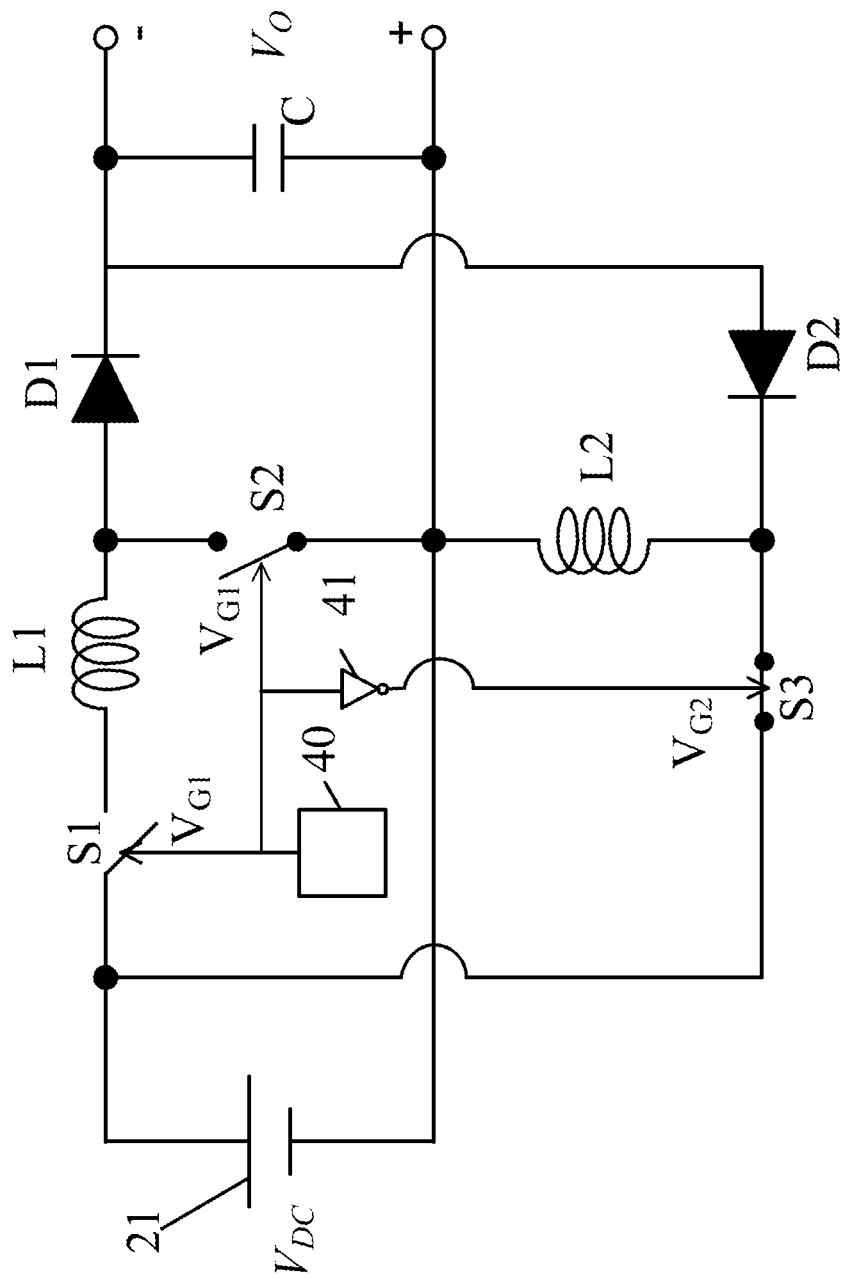
FIG. 3 shows the converter outputting a negative voltage level of driving voltage when the switch S3 turns on in response to the second switch signal.

Referring to FIGS. 2 and 3, FIG. 2 shows the converter 24 outputting a positive voltage level of driving voltage when the switches S1 and S2 turn on in response to the first switch signal $V_{G1}$, and FIG. 3 shows the converter 24 outputting a negative voltage level of driving voltage when the switch S3 turns on in response to the second switch signal $V_{G2}$. When the first switch signal $V_{G1}$ is at high voltage level while the second switch signal $V_{G2}$ is at low voltage level, the switches S1 and S2 turn on but the switch S3 turns off, so that the inductor element L1, the diode D1, and the lighting device 22 form a current loop to feed the driving voltage (i.e. voltage level at the output of the diode D1) to the lighting device 22. The lighting device 22 may emit light based on the positive voltage level of the driving voltage Vo. When the first switch signal $V_{G1}$ is at low voltage level while the second switch signal $V_{G2}$ is at high voltage level, the switches S1 and S2 turn off but the switch S3 turns on, so that the capacitor element L2 and the lighting device 22 form a current loop. At this moment, the driving voltage Vo becomes negative voltage level due to a reversed flow direction through the capacitor element C. Since the first switch signal $V_{G1}$ and the second switch signal $V_{G2}$ are high frequency square wave, the converter 24 is capable of alternately feeding positive/negative voltage levels of the driving voltage to the lighting device 22. In other words, the converter 24 is a DC/DC converter capable of alternately outputting positive/negative voltage levels of the driving voltage by frequently switching which simulates an AC voltage.

Figure 4:
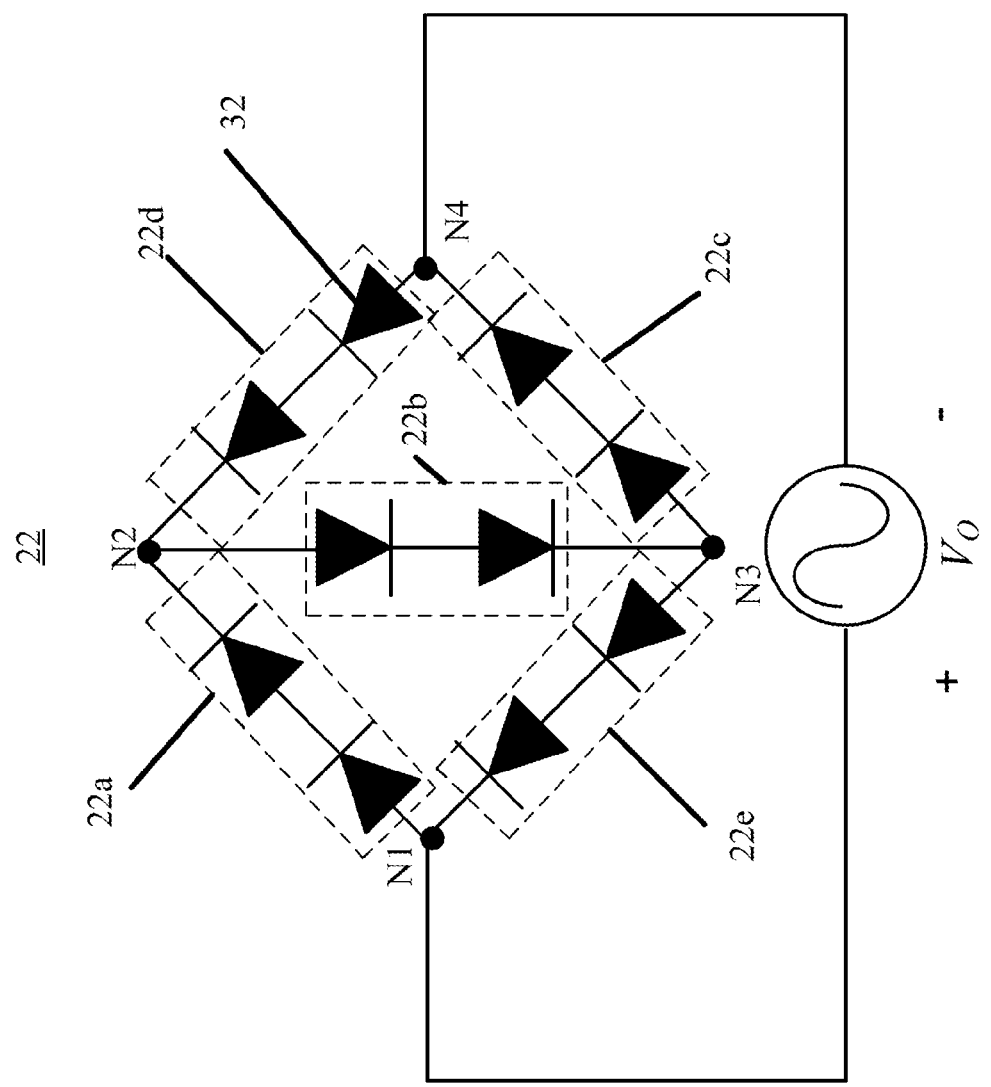
FIG. 4 illustrates another embodiment of the light device as shown in FIG. 1.

Referring to FIG. 4 illustrating another embodiment of the light device 22 as shown in FIG. 1, differing from the AC-driven LED 33, the lighting device 22 comprises a first lighting unit 22a, a second lighting unit 22b, a third lighting unit 22c, a fourth lighting unit 22d, and a fifth lighting unit 22e. The first lighting unit 22a having a positive end and a negative end coupled to a first node N1 and a second node N2, respectively. The second lighting unit 22b having a positive end and a negative end coupled to the second node N2 and a third node N3, respectively. The third lighting unit 22c having a positive end and a negative end coupled to the third node N3 and a fourth node N4, respectively. The fourth lighting unit 22d having a positive end and a negative end coupled to the fourth node N4 and the second node N2, respectively. The fifth lighting unit 22e having a positive end and a negative end coupled to the third node N3 and the first node N1, respectively. Each of the lighting units 22a-22e is a single Light Emitting Diode (LED) 32 or multiple LEDs in series. When the lighting device 22 is fed by the positive voltage level of the driving voltage, the light units 22a, 22b, and 22c are under forward bias to be driven to light, but the lighting units 22d and 22e are under reversed bias to be shut down. Conversely, when the lighting device 22 is fed by the negative voltage level of the driving voltage, the light units 22d, 22b, and 22e are under forward bias to be driven to light, but the lighting units 22a and 22c are under reversed bias to be shut down. Therefore, because a number of three light units are always lighting, a twinkle image is not visible. As it is, the converter 24 without using a current limiting resistor and keeping the LED lighting in a long term can upgrade operating efficiency and thus reduce a risk of LED to be burnt out.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A backlight module comprising a power end for supplying a power supply voltage, characterized in that the backlight module further comprising:

a converter electrically connected to the power end, comprising a switch signal generator for generating a switch signal, the converter for converting the power supply voltage to a positive voltage level of a driving signal in response to a first voltage level of the switch signal, and for converting the power supply voltage to a negative voltage level of the driving signal in response to a second voltage level of the switch signal, the positive and negative voltage levels being generated alternately, the converter comprising:

a capacitor element coupled to the lighting device in parallel;

a first switch electrically coupled to the power end, turning on when the switch signal is at the first voltage level;

a second switch electrically coupled to the power end, turning on when the switch signal is at the first voltage level;

a first inductor element electrically coupled to the first switch;

a second inductor element electrically coupled to the power end, the second switch, and the capacitor element;

a third switch electrically coupled to the second inductor element and the power end, turning on when the switch signal is at the second voltage level;

a first diode comprising a first positive end directly coupled to the first inductor element and the second switch, and a first negative end directly coupled to the capacitor element; and a second diode comprising a second positive end directly coupled to the capacitor element and the first negative end of the first diode, and a second negative end directly coupled to the second inductor element and the third switch; and a lighting device electrically connected to the converter, for generating light based on the positive and negative voltage levels of the driving voltage from the converter.

2. The backlight module of claim 1 characterized in that the lighting device comprises a first lighting unit, a second lighting unit, a third lighting unit, a fourth lighting unit, and a fifth lighting unit, the first lighting unit comprising a positive end and a negative end coupled to a first node and a second node, respectively; the second lighting unit comprising a positive end and a negative end coupled to the second node and a third node, respectively; the third lighting unit comprising a positive end and a negative end coupled to the third node and a fourth node, respectively; the fourth lighting unit comprising a positive end and a negative end coupled to the fourth node and the second node, respectively; the fifth lighting unit comprising a positive end and a negative end coupled to the third node and the first node, respectively.

3. The backlight module of claim 2 characterized in that each of the first, second, third, fourth, and fifth lighting units is a single light emitting diode or multiple LEDs connected in series.

4. The backlight module of claim 1 characterized in that the switch generator further comprises an inverter for inverting the switch signal; the first switch and the second switch turn on based on the switch signal while the third switch turns on based on the inverted switch signal.

5. The backlight module of claim 1 characterized in that the first switch, the second switch, and the third switch turn on based on the switch signal, but an on/off state of the first and second switches is reversed to the on-off state of the third switch.

6. The backlight module of claim 1 characterized in that the lighting device is an AC-driven LED.

7. An LCD device comprising a power end for supplying a power supply voltage and an LCD panel for displaying an image, characterized in that the LCD device further comprising:

a converter electrically connected to the power end, comprising a switch signal generator for generating a switch signal, the converter for converting the power supply voltage to a positive voltage level of a driving signal in response to a first voltage level of the switch signal, and for converting the power supply voltage to a negative voltage level of the driving signal in response to a second voltage level of the switch signal, the positive and negative voltage levels being generated alternately, the converter comprising:

a capacitor element coupled to the lighting device in parallel;

a first switch electrically coupled to the power end, turning on when the switch signal is at the first voltage level;

a second switch electrically coupled to the power end, turning on when the switch signal is at the first voltage level;

a first inductor element electrically coupled to the first switch;

a second inductor element electrically coupled to the power end, the second switch, and the capacitor element;

a third switch electrically coupled to the second inductor element and the power end, turning on when the switch signal is at the second voltage level;

a first diode comprising a first positive end directly coupled to the first inductor element and the second switch, and a first negative end directly coupled to the capacitor element; and a second diode comprising a second positive end directly coupled to the capacitor element and the first negative end of the first diode, and a second negative end directly coupled to the second inductor element and the third switch; and a lighting device electrically connected to the converter, for generating light based on the positive and negative voltage levels of the driving voltage from the converter.

8. The LCD device of claim 7 characterized in that the switch generator further comprises an inverter for inverting the switch signal; the first switch and the second switch turn on based on the switch signal while the third switch turns on based on the inverted switch signal.

9. The LCD device of claim 7 characterized in that the first switch, the second switch, and the third switch turn on based on the switch signal, but an on/off state of the first and second switches is reversed to the on-off state of the third switch.

10. The LCD device of claim 7 characterized in that the lighting device is an AC-driven LED.

* * * * *